(12) United States Patent
Shain et al.

(10) Patent No.: US 10,495,058 B2
(45) Date of Patent: Dec. 3, 2019

(54) JOINT ASSEMBLY FOR ROTOR BLADE SEGMENTS OF A WIND TURBINE

(71) Applicant: General Electric Company, Schenedtady, NY (US)

(72) Inventors: Eric Michael Shain, Simpsonville, SC (US); Xiomara Irizarry-Rosado, Greer, SC (US)

(73) Assignee: General Electric Company, Schenectady, NY (US)

( * ) Notice: Subject to any disclaimer, the term of this patent is extended or adjusted under 35 U.S.C. 154(b) by 317 days.

(21) Appl. No.: 15/437,776

(22) Filed: Feb. 21, 2017

(65) Prior Publication Data

US 2018/0238300 A1 Aug. 23, 2018

(51) Int. Cl.
*F03D 1/06* (2006.01)
*F03D 13/10* (2016.01)

(52) U.S. Cl.
CPC ........... *F03D 1/0675* (2013.01); *F03D 13/10* (2016.05); *F05B 2230/70* (2013.01); *F05B 2260/30* (2013.01); *Y02E 10/721* (2013.01); *Y02P 70/523* (2015.11)

(58) Field of Classification Search
CPC ..... F03D 1/0675; F03D 13/10; Y02E 10/721; Y02E 70/523; F05B 2230/70; F05B 2260/30; F05B 2240/302
USPC ........ 416/223 R, 224, 226, 228, 232, 241 R; 402/292, 293, 359.1, 359.6, 383
See application file for complete search history.

(56) References Cited

U.S. PATENT DOCUMENTS

| 1,879,225 | A | * | 9/1932 | Jakob Haw | B64C 11/20 416/225 |
| 4,389,162 | A | * | 6/1983 | Doellinger | B64C 27/473 416/225 |
| 7,891,947 | B2 | * | 2/2011 | Chen | F03D 1/0675 416/225 |
| 7,901,188 | B2 | * | 3/2011 | Llorente Gonzalez | F03D 1/0675 416/223 R |
| 7,922,454 | B1 | * | 4/2011 | Riddell | F03D 1/0675 416/224 |
| 7,997,874 | B2 | * | 8/2011 | van der Bos | F03D 1/0675 416/223 R |

(Continued)

FOREIGN PATENT DOCUMENTS

| EP | 1950414 A2 * | 7/2008 | ........... F03D 1/0675 |
| EP | 3040551 A1 * | 7/2016 | ........... F03D 1/0658 |

(Continued)

*Primary Examiner* — J. Todd Newton
(74) *Attorney, Agent, or Firm* — Dority & Manning, P.A.

(57) ABSTRACT

The present disclosure is directed to a rotor blade assembly for a wind turbine having a joint assembly securing first and second blade segments together. For example, the joint assembly releasably couples the first and second blade segments together at a chord-wise extending joint and includes at least one set of interlocking components. As such, the joint assembly is movable between a locked position and an unlocked position by engaging and disengaging the interlocking components. Thus, in the locked position, the first and second blade segments are secured together via the interlocking components, and movement from the locked position to the unlocked position, releases the interlocking components, thereby releasing the first and second blade segments from each other.

18 Claims, 8 Drawing Sheets

(56) References Cited

U.S. PATENT DOCUMENTS

| | | | |
|---|---|---|---|
| 7,998,303 B2 | 8/2011 | Bachmann et al. | |
| 8,075,275 B2 | 12/2011 | Althoff et al. | |
| 8,172,539 B2 | 5/2012 | Kootstra | |
| 8,221,085 B2 * | 7/2012 | Livingston | B29C 65/54 156/291 |
| 8,231,351 B2 * | 7/2012 | Nies | F03D 1/065 416/146 R |
| 8,240,962 B2 | 8/2012 | Livingston et al. | |
| 8,328,516 B2 * | 12/2012 | Santiago | F03D 1/0675 244/199.1 |
| 8,348,622 B2 * | 1/2013 | Bech | B29C 66/20 416/223 R |
| 8,356,982 B2 * | 1/2013 | Petri Larrea | F03D 1/0675 403/296 |
| 8,510,947 B2 * | 8/2013 | Kirkpatrick | B23P 15/04 29/889.71 |
| 8,511,996 B2 * | 8/2013 | Llorente Gonzalez | F03D 1/0675 416/132 B |
| 8,517,689 B2 | 8/2013 | Kyriakides et al. | |
| 8,918,997 B2 | 12/2014 | Kyriakides et al. | |
| 9,371,817 B2 * | 6/2016 | Olthoff | F03D 1/065 |
| 9,494,132 B2 * | 11/2016 | Riddell | F03D 1/0633 |
| 9,790,919 B2 * | 10/2017 | Leonard | F03D 1/0675 |
| 2003/0138290 A1 * | 7/2003 | Wobben | B64C 27/46 403/293 |
| 2006/0175731 A1 * | 8/2006 | Bech | B29C 66/1162 264/259 |
| 2007/0018049 A1 * | 1/2007 | Stuhr | B64C 23/069 244/124 |
| 2008/0069699 A1 * | 3/2008 | Bech | B29C 66/20 416/229 R |
| 2008/0145231 A1 * | 6/2008 | Llorente Gonzales | F03D 1/0675 416/243 |
| 2008/0232966 A1 * | 9/2008 | Wang | F03D 1/0658 416/142 |
| 2009/0116962 A1 | 5/2009 | Pedersen et al. | |
| 2010/0158694 A1 * | 6/2010 | Stam | F03D 1/0675 416/230 |
| 2011/0081247 A1 * | 4/2011 | Hibbard | F03D 1/0675 416/226 |
| 2011/0142675 A1 * | 6/2011 | van der Bos | F03D 1/0675 416/241 R |
| 2011/0158788 A1 * | 6/2011 | Bech | F03D 1/0675 415/1 |
| 2011/0243736 A1 * | 10/2011 | Bell | F03D 1/0675 416/132 R |
| 2011/0293432 A1 * | 12/2011 | Hibbard | F03D 1/0675 416/223 R |
| 2012/0141287 A1 * | 6/2012 | Hynum | F03D 1/0675 416/235 |
| 2012/0269643 A1 * | 10/2012 | Hibbard | F03D 1/0675 416/226 |
| 2012/0308396 A1 * | 12/2012 | Hibbard | F03D 1/0683 416/241 R |
| 2014/0186189 A1 * | 7/2014 | Stege | B29D 99/0025 416/229 R |
| 2015/0240780 A1 | 8/2015 | Leonard et al. | |
| 2015/0292477 A1 * | 10/2015 | Kratmann | F03D 1/0633 416/229 R |
| 2017/0122287 A1 * | 5/2017 | Dobbe | F03D 1/0675 |
| 2017/0268482 A1 * | 9/2017 | Beyland | F03D 1/0675 |
| 2018/0135596 A1 * | 5/2018 | Herrig | F03D 1/0675 |
| 2018/0223796 A1 * | 8/2018 | Yarbrough | F03D 1/0675 |
| 2018/0238300 A1 * | 8/2018 | Shain | F03D 1/0675 |

FOREIGN PATENT DOCUMENTS

| | | | | |
|---|---|---|---|---|
| EP | 3425195 A1 * | 1/2019 | | F03D 1/0675 |
| WO | WO-2015011292 A1 * | 1/2015 | | F03D 1/0675 |
| WO | WO-2015051803 A1 * | 4/2015 | | F03D 1/0675 |

* cited by examiner

JOINT ASSEMBLY FOR ROTOR BLADE SEGMENTS OF A WIND TURBINE

FIELD OF THE INVENTION

The present subject matter relates generally to rotor blades for a wind turbine, and more particularly to a joint assembly for securing multiple blade segments of a rotor blade of a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to improve the overall performance of wind turbines by modifying the size, shape and configuration of wind turbine rotor blades. One such modification has been to increase the length of the rotor blade so as to increase the energy captured by the wind. Longer rotor blade, however, are associated with increased transportation costs due to transportation regulations and shipping limits.

Another such modification has been to alter the configuration of the tip of the rotor blade. In particular, blade tips may be specifically designed to enhance or improve various aspects of a rotor blade's performance. For example, certain blade tips may be designed to operate efficiently in specific wind classes. Additionally, blade tips may be configured to enhance specific operating conditions of the wind turbine, such as by being configured to lower torque, reduce noise, or capture the maximum possible energy.

Given that different operating advantages may be provided to a wind turbine depending on the configuration of the rotor blade (i.e. by increasing its length or modifying the blade tip), it would be advantageous to have a joint design for securing blade segments together that allowed for quick and efficient assembly and disassembly thereof.

However, known joint designs are typically complex, expensive to produce, and are manually intensive to install and maintain. For example, joint designs that utilize an adhesive provide permanent joints that cannot be modified with changing wind conditions. In addition, joint designs that utilize bolts typically require periodic maintenance to ensure that the bolts maintain a required torque.

Accordingly, there is a need for an improved joint assembly for securing multiple blade segments of a rotor blade that addresses the aforementioned issues.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a rotor blade assembly for a wind turbine. The rotor blade assembly includes at least first and second blade segments aligned in an end-to-end orientation at a chord-wise extending joint. In addition, the rotor blade assembly includes a joint assembly releasably coupling the first and second blade segments together at the chord-wise extending joint. Further, the joint assembly includes at least one set of interlocking components. As such, the joint assembly is movable between a locked position and an unlocked position by engaging and disengaging the interlocking components. Thus, in the locked position, the first and second blade segments are secured together via the interlocking components. Moreover, movement from the locked position to the unlocked position releases the interlocking components, thereby releasing the first and second blade segments from each other.

In one embodiment, the set of interlocking components may include a first set of teeth configured with the first blade segment and a second set of teeth configured with the second blade segment. Thus, in the locked position, the first and second sets of teeth engage each other so as to secure the first and second blade segments together. More specifically, in certain embodiments, the first and second sets of teeth are secured to an inner surface of the first and second blade segments, respectively.

In another embodiment, the joint assembly may include a spring-locking system. More specifically, in such embodiments, the spring-locking system includes a plurality of springs, with at least one of the springs secured between the inner surface of the first blade component and a tooth from the first set of teeth and another one of the springs secured between the inner surface of the second blade component and a tooth from the second set of teeth.

In further embodiments, the joint assembly may include one or more input devices exposed to an outer surface of one of the first and second blade segments. For example, in one embodiment, the input device(s) may include a movable button feature and/or a twist handle that can be engaged by a user. In such embodiments, each of the input devices may also be engaged with one of the interlocking components and/or springs. As such, a user can release the spring-locking system from the outer surface, thereby releasing the first and second blade segments from each other. In addition, the input device(s) may be flush with the rotor blade and have a surface finish such that the aerodynamics of the rotor blade are not affected.

In alternative embodiments, the first and second sets of teeth may be constructed of a flexible material, a rigid material, a metallic material, one or more composite materials, or combinations thereof.

In yet another embodiment, the first and second sets of teeth are adjustable. For example, in certain embodiments, the joint assembly may include an adjustable mounting device mounted at a first end of each of the first and second sets of teeth. Thus, the adjustable mounting device(s) are configured to secure each of the first and second sets of teeth to the inner surface of the first and second blade segments. In addition, fine adjustments can be made to the first and second sets of teeth so as to properly align and secure the blade segments together.

In additional embodiments, the rotor blade assembly may include a plurality of interlocking components oriented in both a chord-wise and a span-wise direction so as to mitigate loads.

In still further embodiments, one of the blade segments may correspond to a blade tip segment of the rotor blade. In further embodiments, the rotor blade assembly may include a plurality of blade segments.

In another aspect, the present disclosure is directed to a method for joining multiple blade segments of a rotor blade. The method includes aligning a first blade segment and a second blade segment in an end-to-end orientation at a chord-wise extending joint. Further, the method includes engaging a plurality of interlocking components of a joint assembly at the chord-wise extending joint. Thus, engagement of the interlocking components secures the first and second blade segments in a locked position.

In one embodiment, the step of engaging the plurality of interlocking components of the joint assembly at the chord-wise extending joint may include twisting one of the first and second blade segments with respect to the other. In such embodiments, when the first and second blade segments are twisted together, the interlocking components may be set up as to apply the required pressure before locking into place.

Alternatively, the step of engaging the plurality of interlocking components of the joint assembly at the chord-wise extending joint may include pushing one of the blade segments into the other so as to engage the interlocking components of the joint assembly.

In still another alternative embodiment, the step of engaging the plurality of interlocking components of the joint assembly at the chord-wise extending joint may include utilizing a rail system that may be connected with chains or bars on a cam to drive the interlocks.

It should be further understood that the method may further include any of the additional steps and/or features as described herein. Thus, in certain embodiments, the method may include securing the first and second sets of teeth to an inner surface of the first and second blade segments, respectively.

In additional embodiments, the method may include adjusting the first and second sets of teeth via an adjustable mounting device mounted at a first end of each of the first and second sets of teeth and securing each of the first and second sets of teeth to the inner surface of the first and second blade segments via the adjustable mounting device.

In additional embodiments, the method may include adding a filler and/or sealant so as to fill any gaps between the first and second segments so as to maintain the aerodynamic shape of the rotor blade. In particular embodiments, the filler and/or sealant may or may not be painted over to maintain continuity in surface color.

In another aspect, the present disclosure is directed to a method for disassembling multiple blade segments of a rotor blade, the rotor blade having a first blade segment and a second blade segment secured together in an end-to-end orientation at a chord-wise extending joint. The method includes disengaging a plurality of interlocking components of a joint assembly at the chord-wise extending joint. Further, the method includes removing one of the first and second blade segments from the other.

In one embodiment, the step of disengaging the plurality of interlocking components of the joint assembly at the chord-wise extending joint may include twisting one of the first and second blade segments with respect to the other. In alternative embodiments, the step of disengaging the plurality of interlocking components of the joint assembly at the chord-wise extending joint may include engaging (e.g. by pressing or turning) an input device that allows the first and second blade segments to separate transversely with or without twist.

Alternatively, the step of disengaging the plurality of interlocking components of the joint assembly at the chord-wise extending joint may include pulling one of the blade segments apart from the other so as to disengage the interlocking components of the joint assembly.

It should be further understood that the method may further include any of the additional steps and/or features as described herein. In addition, the step of removing one of the first and second blade segments from the other may include releasing the interlocking components from an outer surface of the first and second blade segments via one or more input devices, e.g. via a button feature and/or a twist handle.

In another embodiment, as mentioned, one of the blade segments may correspond to a blade tip segment of the rotor blade. In such embodiments, the method may include replacing the blade tip segment with a different blade tip segment.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a segmented rotor blade for a wind turbine having at least one mechanical joint assembly securing first and second blade segments together. For example, the joint assembly releasably couples the first and second blade segments together at a chord-wise extending joint and includes at least one set of interlocking components. As such, the joint assembly is movable between a locked position and an unlocked position by engaging and disengaging the interlocking components. Thus, in the locked position, the first and second blade segments are secured together via the interlocking components. Further, movement from the locked position to the unlocked position releases the interlocking components, thereby releasing the first and second blade segments from each other.

The joint assembly of the present disclosure provides many advantages not present in the prior art. For example, the joint assembly of the present disclosure provides a robust joint that reduces installation time and required tooling. Further, the joint assembly enables future service offerings for improved wind turbine performance and/or value, e.g. by providing customizable blade tips and/or blade improvements as they become available. In addition, the segmented rotor blade reduces shipping costs.

Figure 1:
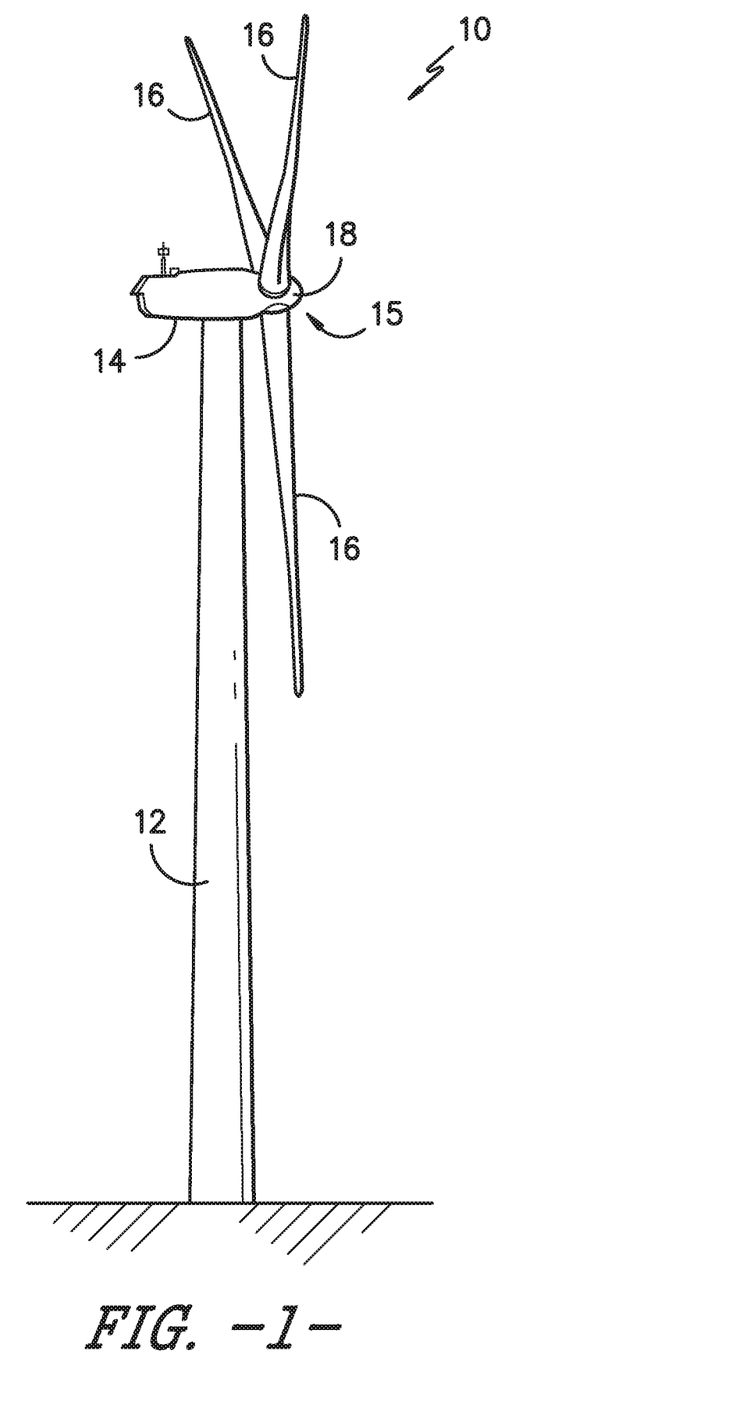
FIG. 1 illustrates a perspective view of a wind turbine of conventional construction.

Referring now to the drawings, FIG. 1 illustrates a perspective view of a wind turbine 10 of conventional construction. As shown, the wind turbine 10 includes a tower 12 extending from a support surface with a nacelle 14 mounted thereon. A rotor 15 is mounted atop the tower 12 and includes a rotatable hub 18 having a plurality of rotor blades 16 mounted thereon, which is, in turn, connected to a main flange that turns a main rotor shaft (not shown). The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Figure 2:
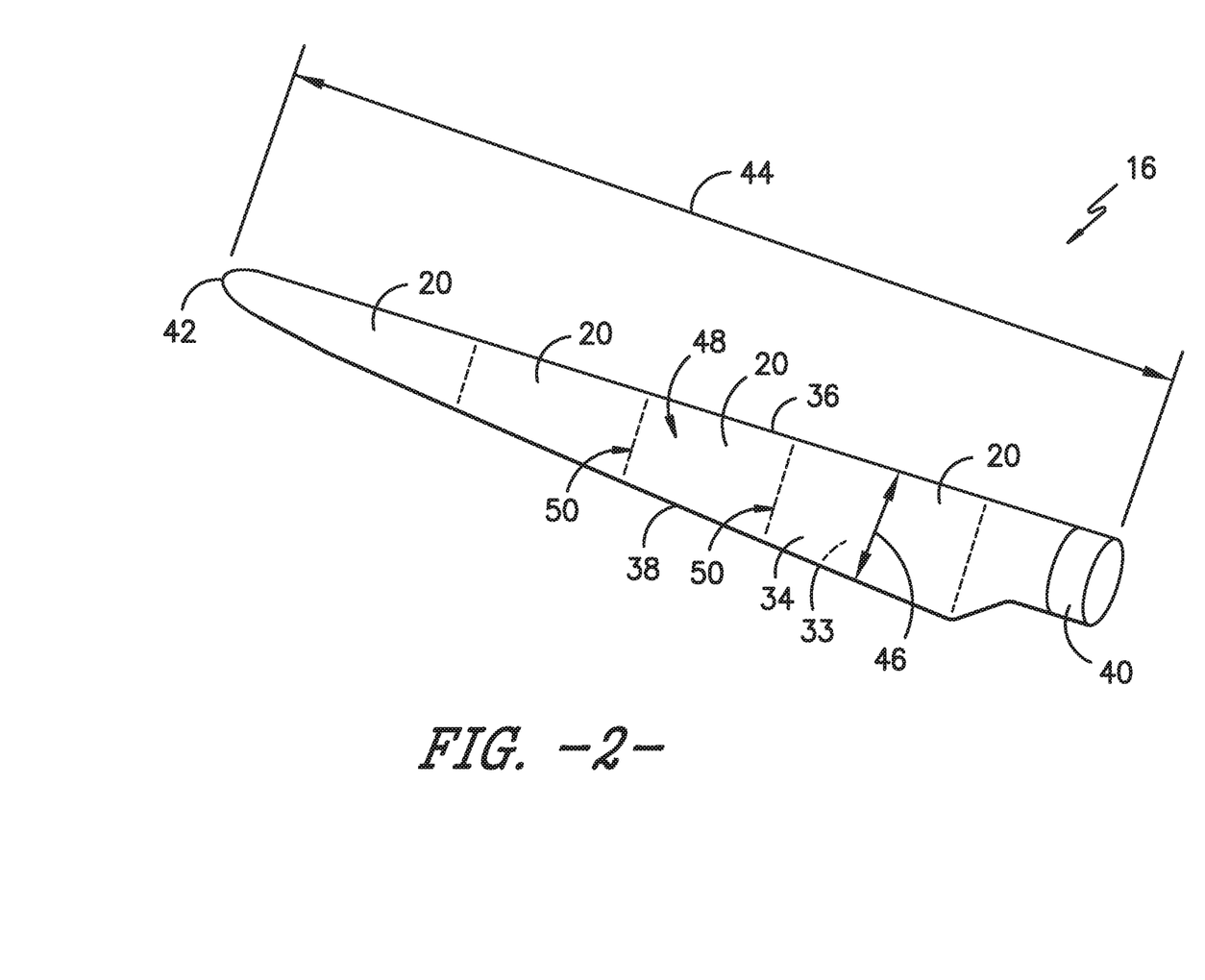
FIG. 2 illustrates a perspective view of one embodiment of a segmented rotor blade having a plurality of joint assemblies securing each of the blade segments together according to the present disclosure.

Referring now to FIG. 2, a perspective view of one embodiment of one of the rotor blades 16 of FIG. 1 is illustrated. For example, as shown, the rotor blade 16 may generally include a suction side 34 and a pressure side 33 extending between a leading edge 36 and a trailing edge 38. Additionally, the rotor blade 16 may include a root end 40 configured to be mounted to the hub 18 (FIG. 1) of the wind turbine 10 and a tip end 42 disposed opposite the root end 40. Further, the rotor blade 16 may have a span 44 defining the total length between the root end 40 and the tip end 42 and a chord 46 defining the total length between the leading edge 36 and the trailing edge 38. As is generally understood, the chord 46 may generally vary in length with respect to the span 44 as the rotor blade extends from the blade root 40 to the blade tip 42.

Figure 3:
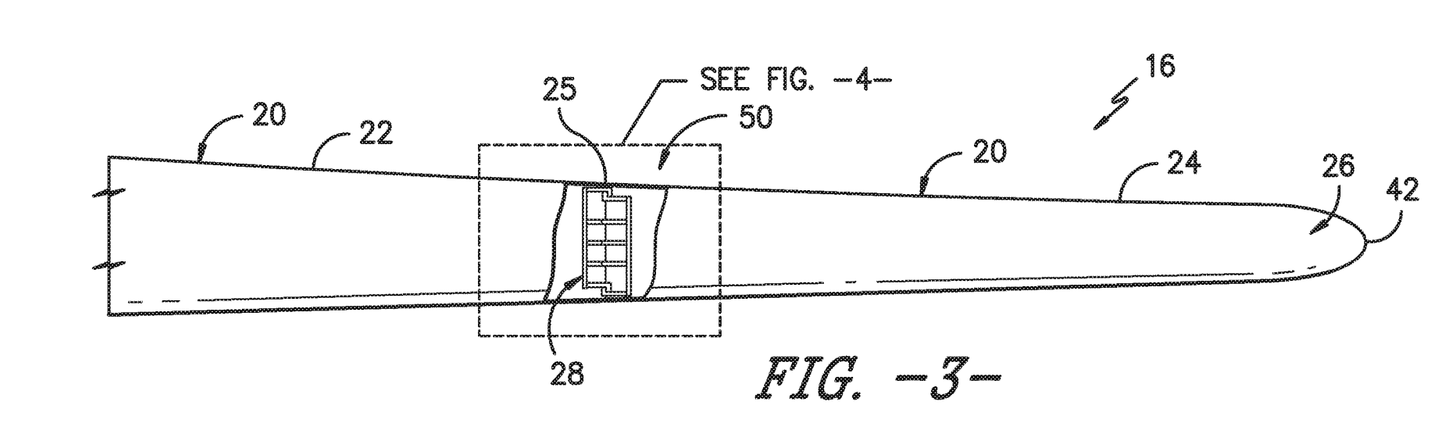
FIG. 3 illustrates a partial, perspective view of one embodiment of a segmented rotor blade according to the present disclosure, particularly illustrating a joint assembly configured at a chord-wise extending face between first and second blade segments.

In addition, as shown, the rotor blade 16 may include a plurality of individual blade segments 20 aligned in an end-to-end order from the root end 40 to the tip end 42. For example, as shown in the illustrated embodiment, the rotor blade 16 includes a first blade segment 22 connected to a second blade segment 24 at a chord-wise extending face 25. Further, as shown, the blade segments 22, 24 of the rotor blade 16 may each include a body shell 48 generally serving as the outer casing/covering of the blade segment 22, 24. The body shell 48 may generally define a substantially aerodynamic profile, such as by defining a symmetrical or cambered airfoil shaped cross-section. Thus, the body shell 48 of each blade segment 22, 24 may define the pressure side 33, the suction side 34, the leading edge 36 and the trailing edge 38 of the rotor blade 16. More specifically, each of the individual blade segments 20 may be uniquely configured so that the plurality of segments 20 define a complete rotor blade 16 having the designed aerodynamic profile, length, and other desired characteristics. For example, each of the blade segments 20 may have an aerodynamic profile that corresponds to the aerodynamic profile of adjacent blade segments 20. Thus, the aerodynamic profiles of the blade segments 20 form a continuous aerodynamic profile of the rotor blade 16. In an exemplary embodiment, the complete segmented rotor blade 16 may have a swept shape giving it a curved contoured aerodynamic profile running from the distal end to the proximal end of the rotor blade 16. In an alternative embodiment, the segmented rotor blade 16 may have a non-swept shape and respective aerodynamic profile. In further embodiments, one of the blade segments 22, 24 may correspond to a blade tip segment 26 of the rotor blade 16. For example, as shown in FIG. 3, the second blade segment 24 corresponds to the blade tip segment 26 of the rotor blade 16. It should be appreciated that, although the rotor blade 16 of the present subject matter is illustrated and described herein as including two blade segments 22, 24, the rotor blade 16 may generally comprise any number of blade segments configured as described and illustrated herein.

Additionally, the blade segments 22, 24 may generally be formed from any suitable material. For instance, in one embodiment, the blade segments 22, 24 may be formed entirely from a composite laminate material, such as a carbon fiber-reinforced composite or a glass fiber-reinforced composite. Alternatively, one or more portions of the blade segments 22, 24 may be configured as a layered construction and may include a core material, formed from a lightweight material such as wood (e.g., balsa), foam (extruded polystyrene foam) or a combination of such materials, disposed between layers of composite laminate material.

In addition, the rotor blade 16 may also include one or more structural components configured therein. For example, as particularly shown in FIG. 5, the rotor blade 16 may include a shear web 60 configured to extend longitudinally within the blade shell 48 and perpendicularly between opposing spar caps 62, 64. Alternatively, the rotor blade 16 may include two or more shear webs 60 extending between the opposing spar caps 62, 64. The spar caps 62, 64 may similarly be configured to extend longitudinally within the blade shell 48, with the spar caps 62, 64 generally engaging inner surfaces of the pressure and suction sides 33, 34 of the rotor blade 16, respectively. In general, the shear web(s) 60 and spar caps 62, 64 may serve as a beam-like or other structural-type component for providing structural rigidity and increasing strength to the rotor blade 16. It should be appreciated that the shear web(s) 60 and the spar caps 62, 64 may generally be formed of any suitable material that permits such components to function as described herein. For example, in one embodiment, the spar caps 62, 64 may be formed from a composite material, such as a unidirectional carbon fiber-reinforced composite, and the shear web(s) 60 may be formed from foam, wood or a similar lightweight material strengthened with a fiber-reinforced composite.

Figure 4:
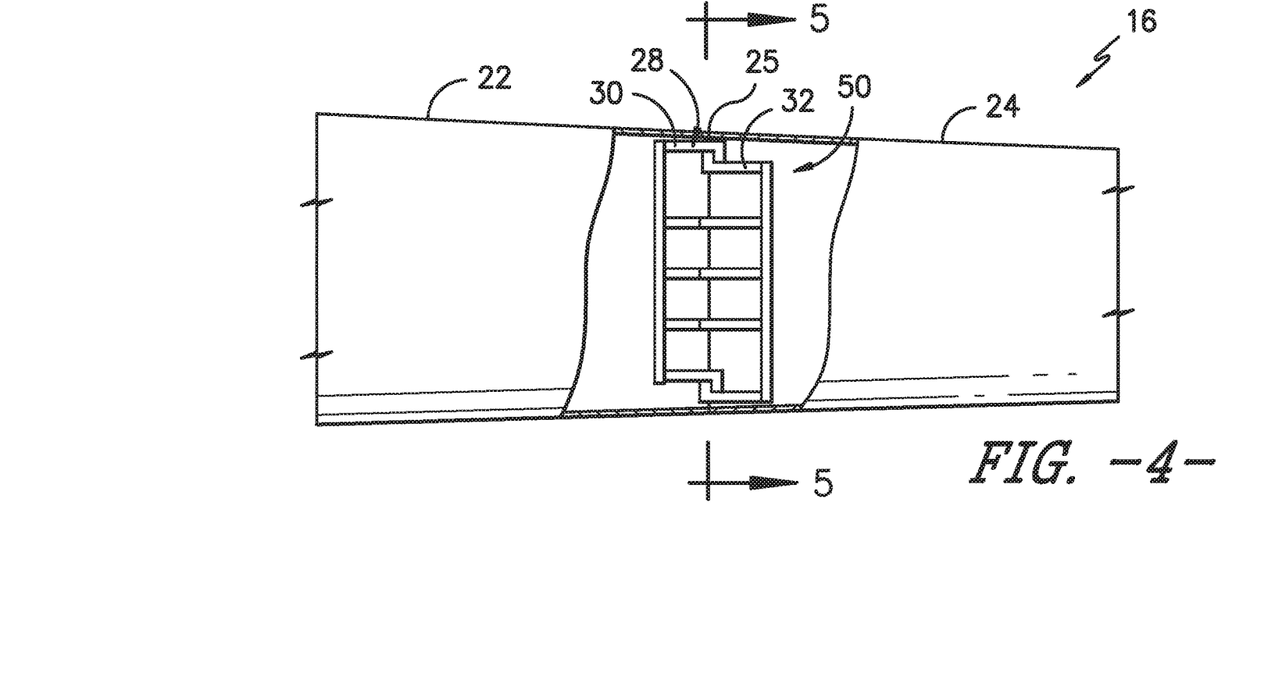
FIG. 4 illustrates a detailed, perspective view of the joint assembly of FIG. 3.
Figure 5:
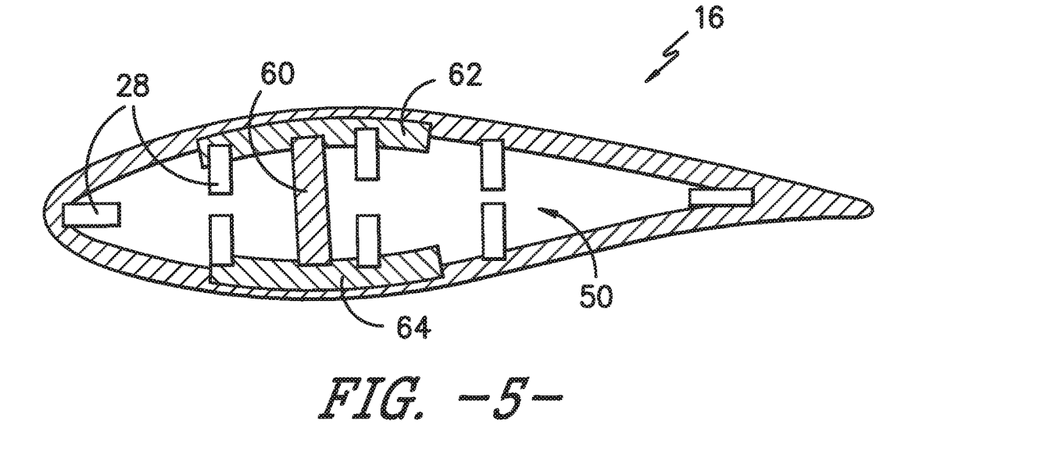
FIG. 5 illustrates a detailed, cross-sectional view of the joint assembly of FIG. 3.
Figure 6:
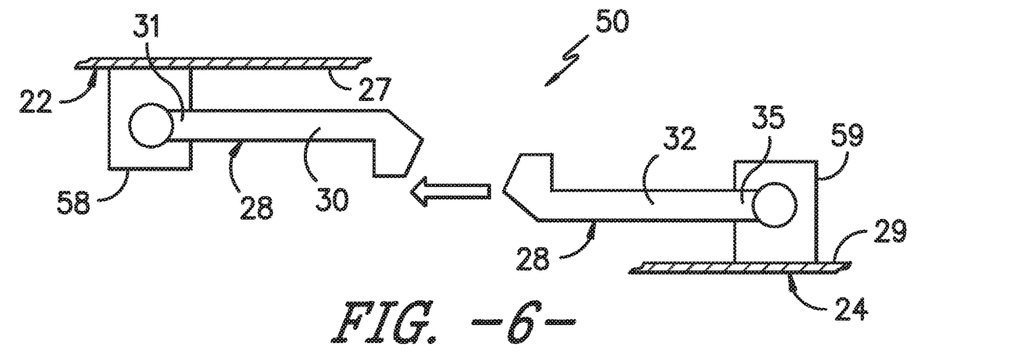
FIG. 6 illustrates a schematic diagram of one embodiment of the joint assembly according to the present disclosure, particularly illustrating first and second sets of teeth of the first and second blade segments being assembled together.
Figure 7:
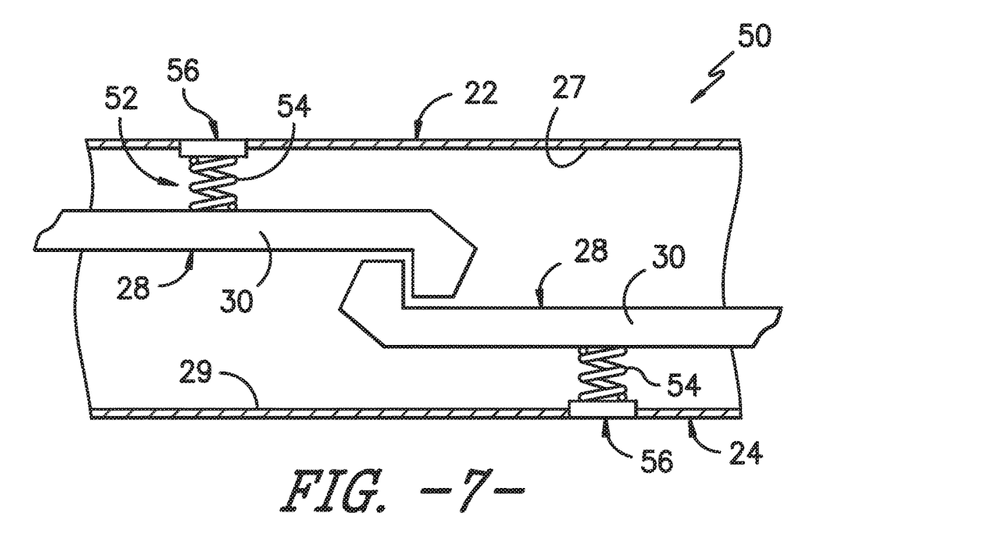
FIG. 7 illustrates a schematic diagram of one embodiment of the joint assembly according to the present disclosure, particularly illustrating the first and second sets of teeth of the first and second blade segments assembled together.

Referring now to FIGS. 2-7, the rotor blade 16 further includes one or more joint assemblies 50 configured between adjacent blade segments 22, 24 at the chord-wise extending face 25. In particular, FIG. 2 illustrates a perspective view of one embodiment of the rotor blade 16 having multiple blade segments 20 joined via respective joint assemblies 50. FIGS. 3 and 4 illustrate span-wise views of one embodiment of the rotor blade 16, particularly illustrating one of the joint assemblies 50. FIG. 5 illustrates a cross-sectional view of one embodiment of the rotor blade 16 having the joint assembly 50 mounted to inner surfaces of the first and second blade segments 22, 24. FIGS. 6 and 7 illustrate schematic views of one embodiment of the joint assembly 50 of the present disclosure. FIGS. 8A, 8B, 8C, and 8D illustrate various examples of teeth configurations for the interlocking components of the joint assembly 50 of the present disclosure.

Referring particularly to FIGS. 3 and 4, the joint assembly 50 releasably couples the first and second blade segments 22, 24 together at the chord-wise extending face 25. Further, as shown in FIGS. 3-7, the joint assembly 50 includes at least one set of interlocking components 28. As such, the joint assembly 50 is movable between a locked position (FIGS. 3-4 and 7) and an unlocked position (FIG. 6) by engaging and disengaging the interlocking components 28. Thus, in the locked position, the first and second blade segments 22, 24 are secured together via the interlocking components 28. In addition, movement from the locked position to the unlocked position, e.g. via twisting one of the blade segments 22, 24 with respect to the other, releases the interlocking components 28 so as to release the first and second blade segments 22, 24 from each other.

More specifically, as shown particularly in FIGS. 6 and 7, the set of interlocking components 28 may include a first set of teeth 30 configured with the first blade segment 22 and a second set of teeth 32 configured with the second blade segment 24. In such embodiments, the first and second sets of teeth 30, 32 engage each other in the locked position (FIG. 7). More specifically, as shown, the first and second sets of teeth 30, 32 are secured to the inner surface 27, 29 of the first and second blade segments 22, 24, respectively. For example, as shown particularly in FIG. 6, the first and second sets of teeth 30, 32 may be mounted to the inner surfaces 27, 29 of the first and second blade segments 22, 24 via respective mounting devices 58, 59. For example, as shown, the mounting devices 58, 59 may be mounted at the first ends 31, 35 of each of the first and second sets of teeth 30, 32. Thus, the adjustable mounting device(s) 58, 59 are configured to secure each of the first and second sets of teeth 30, 32 to the inner surfaces 27, 29 of the first and second blade segments 22, 24, respectively. In addition, as shown, the first and second sets of teeth 30, 32 may be adjusted via the adjustable mounting devices 58, 59 so as to make fine adjustments of the blade segments 22, 24 once the segments 22, 24 are secured together.

Figure 8A:
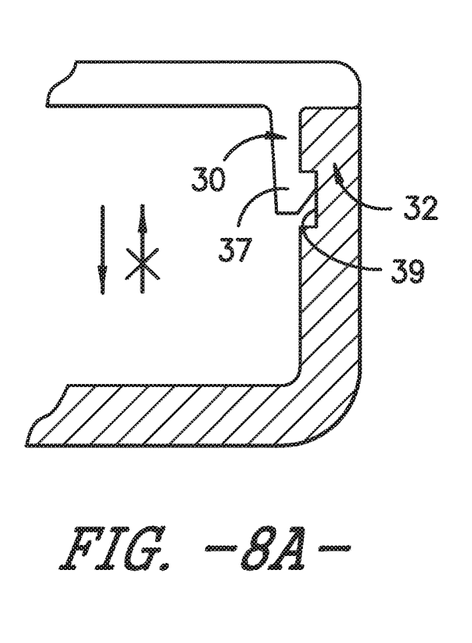
FIGS. 8A, 8B, 8C, and 8D illustrate various embodiments of the interlocking components of the joint assembly according to the present disclosure.
Figure 8B:
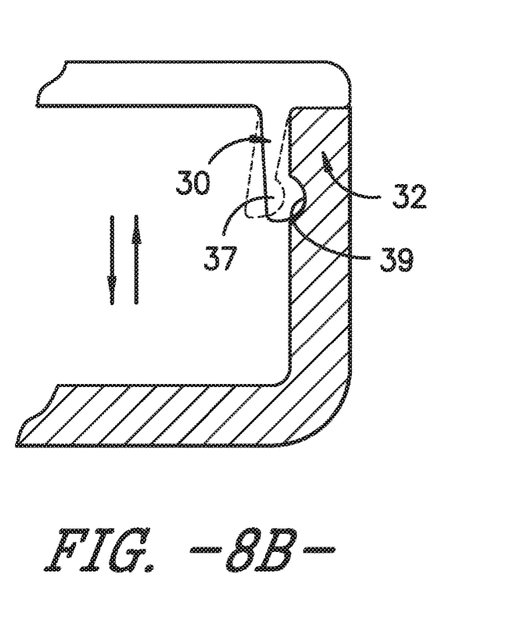
Figure 8C:
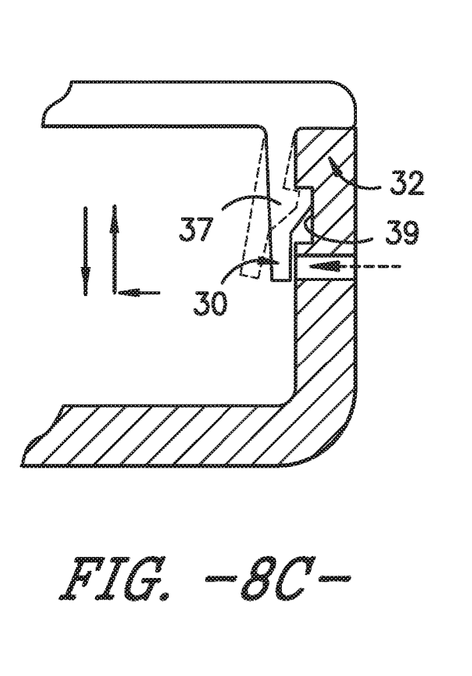
Figure 8D:
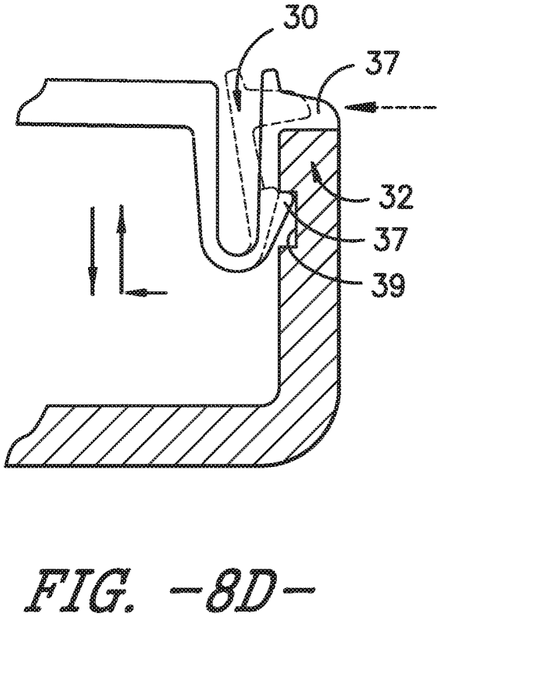

Referring now to FIGS. 8A, 8B, 8C, and 8D, various embodiments of the interlocking components 28/teeth 30, 32 of the joint assembly 50 as described herein are illustrated. For example, as shown, the first set of teeth 30 may include at least one protrusion 37 or lip, whereas the second set of teeth 32 may include a corresponding recess 39 configured to receive the lip 37. Thus, as shown in FIGS. 8A and 8B, the first and second sets of teeth 30, 32 may fit together, e.g. via a snap fit. In addition, as shown in FIG. 8C, the first set of teeth 30 may also include an additional extension 41 configured to align with an opening 43 in the second set of teeth 32. In such embodiments, the first set of teeth 30 may be disengaged from the second set of teeth 32 by engaging the extension (e.g. by pushing the extension away from the second set of teeth 32 as indicated by the arrow). Moreover, as shown in FIG. 8D, the first set of teeth 30 may have a U-shaped configuration with at least two protrusions 37 configured to engage the second set of teeth 32. In such embodiments, the first set of teeth 30 may be disengaged from the second set of teeth 32 by engaging the upper protrusion 37 (e.g. by pushing the upper protrusion 37 away from the second set of teeth 32 as indicated by the arrow). It should be understood that any other suitable configuration of teeth 30, 32 are within the spirit and scope of the invention and the embodiments of FIGS. 88A, 8B, 8C, and 8D are provided for illustrative purposes only.

In another embodiment, as shown in FIG. 7, the joint assembly 50 may also include a spring-locking system 52. In such embodiments, as shown, the spring-locking system 52 includes a plurality of springs 54. More specifically, as shown, at least one of the springs 54 is secured between the inner surface 57 of the first blade component 22 and a tooth from the first set of teeth 30 and another one of the springs 54 is secured between the inner surface 29 of the second blade component 24 and a tooth from the second set of teeth 32. As such, the springs 54 provide flexibility to the joint assembly 50 such that the first and second blade segments 22, 24 can be easily assembled and disassembled.

For example, in further embodiments, as shown in FIG. 7, the joint assembly 50 may include one or more input devices 56 (e.g. a quick-release button feature and/or a twist handle) mounted on or exposed to an outer surface of one of the first and second blade segments 22, 24. In such embodiments, as shown, each of the input devices 56 is engaged with one of the springs 54 such that a user can release the spring-locking system 50 from the outer surface of the segments 22, 24, thereby releasing the first and second blade segments 22, 24 from each other. In further embodiments, the input device(s) 56 may be engaged with the interlocking components 28 directly. More specifically, in certain embodiments, an operator may engage one of the input devices 56 from the outer surface of the segments 22, 24 so as to disengage the interlocking components 28, twist one of the segments 22, 24 with respect to the other, and remove one of the segments 22, 24 from the other.

In alternative embodiments, rather than having the spring-locking system 50 as described above, the first and second sets of teeth 30, 32 may be constructed of a flexible material. As such, the material of the first and second sets of teeth 30, 32 is configured to provide the desired flexibility to the joint assembly 50 such that the first and second blade segments 22, 24 can be easily assembled and disassembled.

Figure 14:
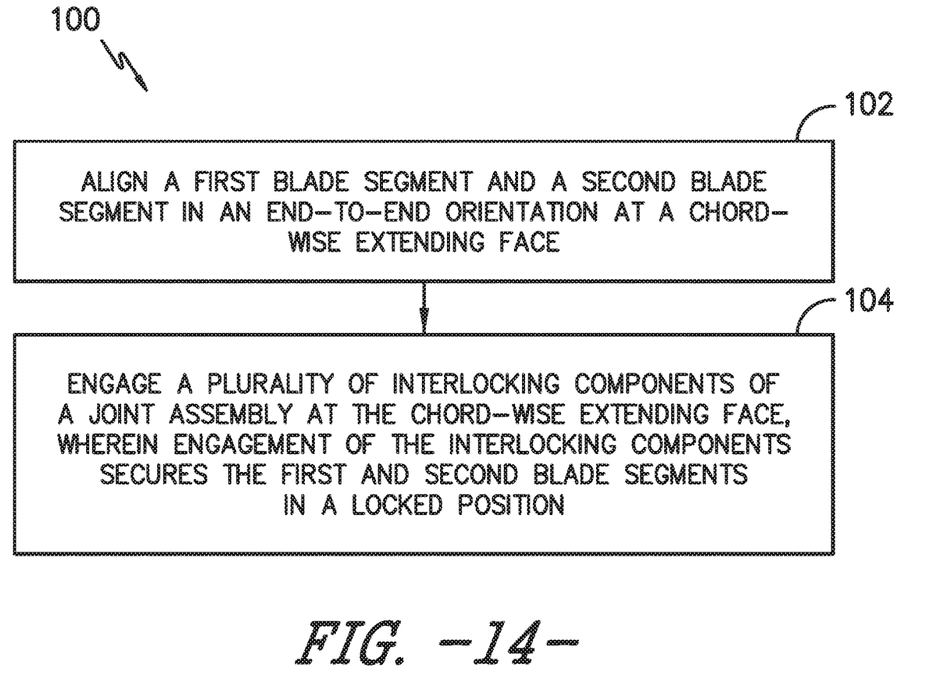
FIG. 14 illustrates a flow diagram of one embodiment of a method for joining multiple blade segments of a rotor blade according to the present disclosure; and, FIG. 15 illustrates a flow diagram of one embodiment of a method for disassembling multiple blade segments of a rotor blade according to the present disclosure.

Referring now to FIG. 14, a flow diagram of one embodiment of a method 100 for joining multiple blade segments 22, 24 of a rotor blade 16 is illustrated. As shown at 102, the method 100 includes aligning a first blade segment 22 and a second blade segment 24 in an end-to-end orientation at a chord-wise extending face 25. Further, as shown at 104, the method 100 includes engaging a plurality of interlocking components 28 of a joint assembly 50 at the chord-wise extending face 25, wherein engagement of the interlocking components 28 secures the first and second blade segments 22, 24 in a locked position.

Figure 9:
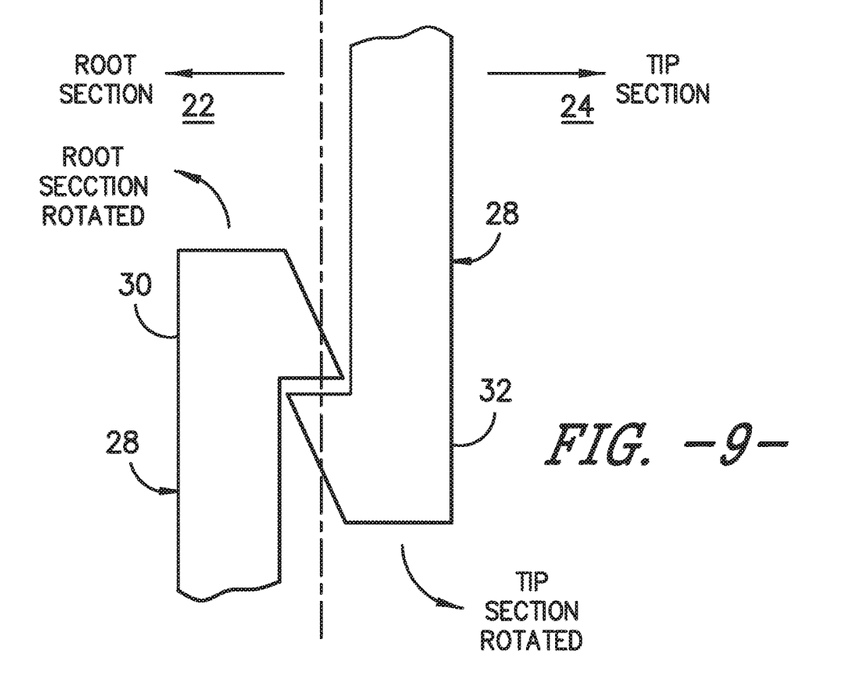
FIG. 9 illustrates a schematic diagram of another embodiment of the joint assembly according to the present disclosure, particularly illustrating the first and second sets of teeth of the first and second blade segments being twisted together.
Figure 10:
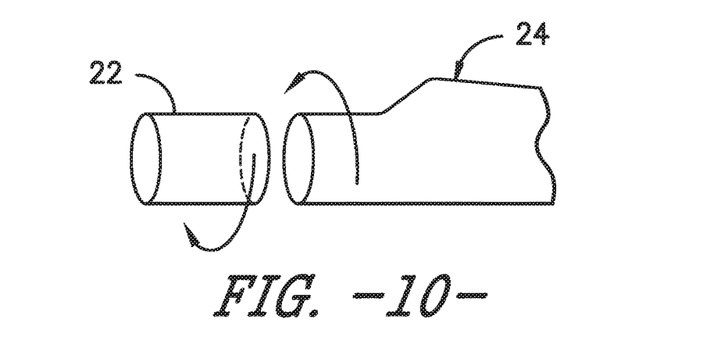
FIG. 10 illustrates a partial, perspective view of one embodiment of a blade root segment and a blade tip segment being twisted together according to the present disclosure.
Figure 11:
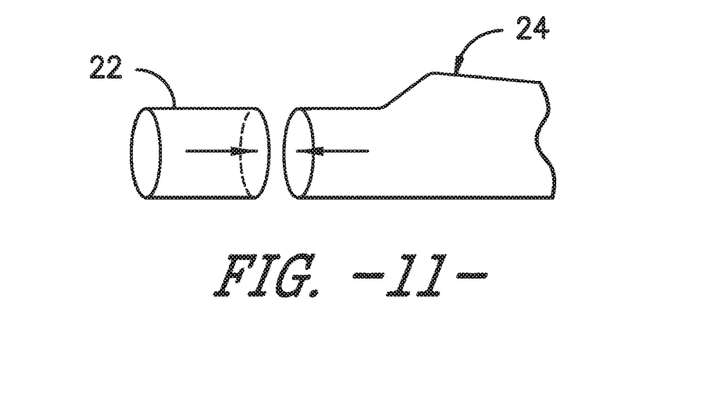
FIG. 11 illustrates a partial, perspective view of one embodiment of a blade root segment and a blade tip segment being pushed together according to the present disclosure.

In one embodiment, as shown in FIGS. 9 and 10, the step of engaging the plurality of interlocking components 28 of the joint assembly 50 may include twisting one of the first and second blade segments 22, 24 with respect to the other. In such embodiments, when the first and second blade segments 22, 24 are twisted together, the interlocking components 28 may be set up as to apply the required pressure before locking into place.

Alternatively, as shown in FIG. 10, the step of engaging the plurality of interlocking components 28 of the joint assembly 50 may include pushing one of the blade segments 22, 24 into the other so as to engage the interlocking components 28 of the joint assembly 50.

Figure 12:
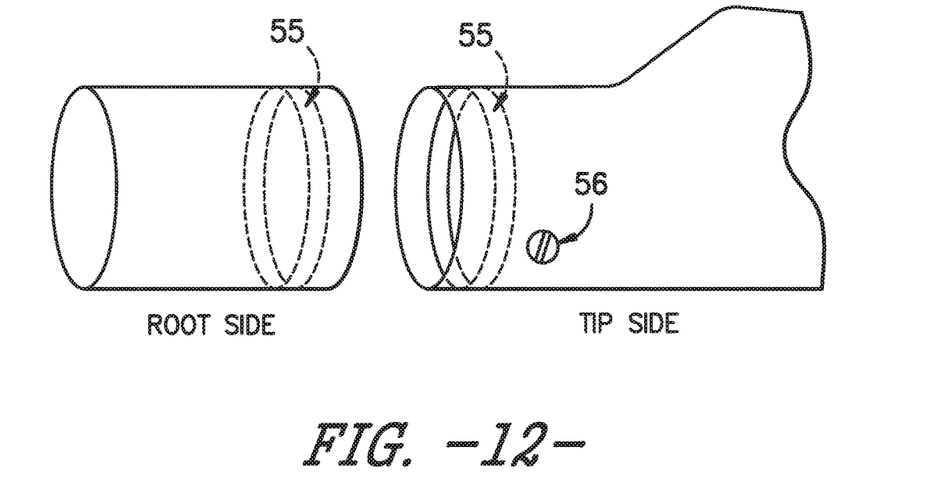
FIG. 12 illustrates a schematic diagram of one embodiment of a rail system for joining interlocking components of the joint assembly.
Figure 13:
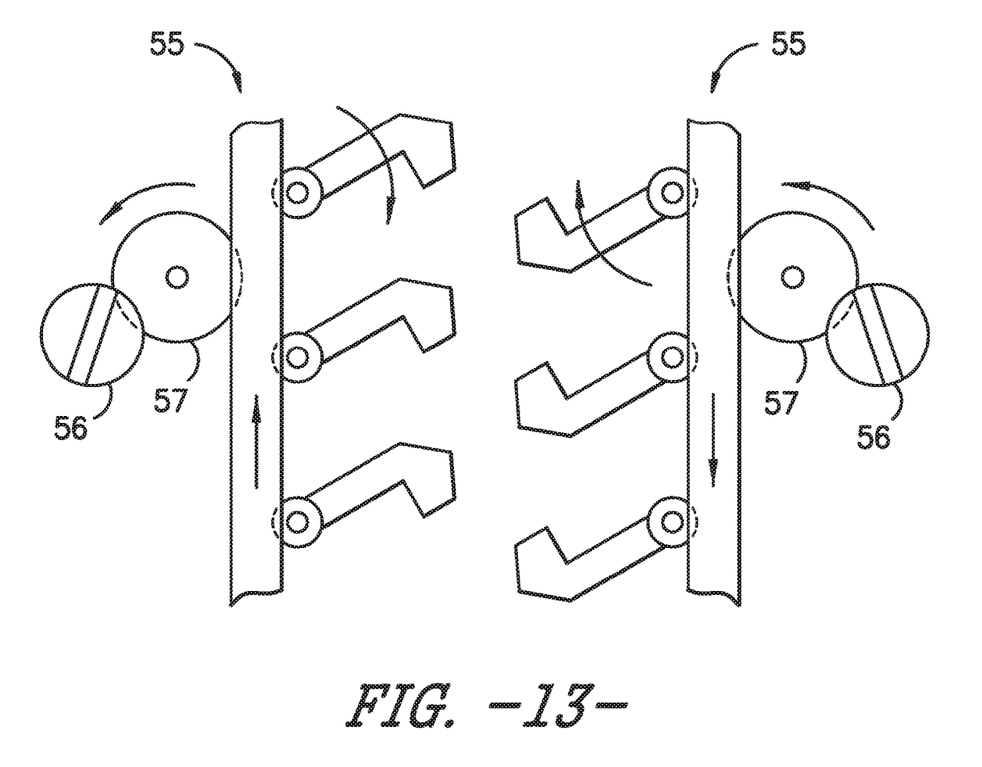
FIG. 13 illustrates a schematic diagram of one embodiment of various components of the rail system of FIG. 12.

In still another alternative embodiment, as shown in FIG. 12, the step of engaging the plurality of interlocking components 28 of the joint assembly 50 joint may include utilizing a rail system 55 that may be connected with a chain 59 or belt on a cam 57 to drive the interlock components 28. More specifically, as shown in FIG. 13, when a user engaged the input device 56 on the blade surface, tooth gears of the input device 56 engage tooth gears of the cam 57, which turns the chain 59, thereby rotating either the root side or the tip side of the rotor blade 16.

In additional embodiments, where the interlocking components 28 correspond to the teeth 30, 32 described herein, the method 100 may also include securing the first and second sets of teeth 30, 32 to the inner surfaces 27, 29 of the first and second blade segments 22, 24, respectively. As such, the joint assembly 50 may be retrofitted to existing rotor blades and/or installed onto new rotor blades.

In additional embodiments, the method 100 may include adjusting the first and second sets of teeth 30, 32 via one or more adjustable mounting devices 58, 59 mounted at the first ends 31, 35 of each of the first and second sets of teeth 30, 32. In such embodiments, the step of securing each of the first and second sets of teeth 30, 32 to the inner surfaces 27, 29 of the first and second blade segments 22, 24 may include securing the teeth 30, 32 to the inner surfaces 27, 29 of the segments 22, 24 via the adjustable mounting devices 58, 59. In further embodiments, the method 100 may include adjusting the first and second blade segments 22, 24 via the mounting devices 58, 59.

Figure 15:
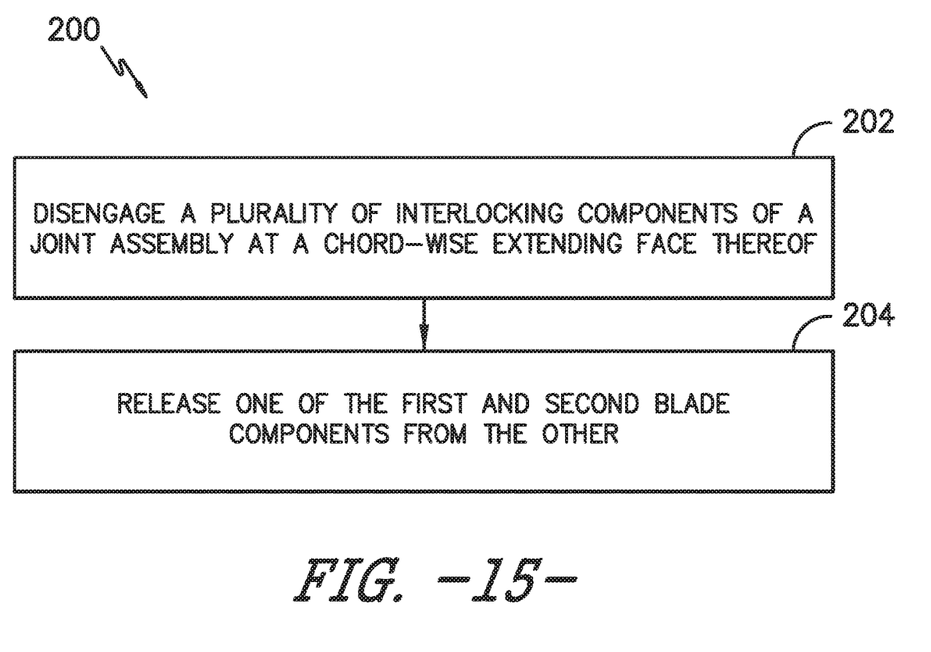

Referring now to FIG. 15, a flow diagram of one embodiment of a method 200 for disassembling multiple blade segments 22, 24 of a rotor blade 16 is illustrated. As mentioned, such rotor blades 16 are segmented having at least a first blade segment 22 and a second blade segment 24 secured together in an end-to-end orientation at a chord-wise extending face 25. Thus, as shown at 202, the method includes 202 disengaging a plurality of interlocking components 28 of a joint assembly 50 at the chord-wise extending joint 25. Further, as shown at 204, the method 200 includes releasing one of the first and second blade segments 22, 24 from the other.

In additional embodiments, the method may include disengaging the interlocking components 28 from an outer surface thereof via one or more input devices 56, such as the button features and/or the twist handles as described herein. In another embodiment, the method 200 may include replacing a blade tip segment corresponding to the blade tip segment with a different blade tip segment. As such, a variety of blade tips can be easily exchanged based on desired blade characteristics.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly for a wind turbine, the rotor blade assembly comprising:
   a first blade segment;
   a second blade segment aligned in an end-to-end orientation with the first blade segment at a chord-wise extending joint; and,
   a joint assembly releasably coupling the first and second blade segments together at the chord-wise extending joint, the joint assembly comprising first and second sets of teeth configured with the first and second blade segments, respectively, the joint assembly being movable between a locked position and an unlocked position by engaging and disengaging the first and second sets of teeth, wherein, in the locked position, the first and second sets of teeth engage each other
   wherein, in the locked position, the first and second blade segments are secured together via the first and second teeth engaging each other, and wherein, movement from the locked position to the unlocked position, releases the first and second sets of teeth, thereby releasing the first and second blade segments from each other.

2. The rotor blade assembly of claim 1, wherein the first and second sets of teeth are secured to an inner surface of the first and second blade segments, respectively.

3. The rotor blade assembly of claim 2, wherein the joint assembly further comprises a spring-locking system, the spring-locking system comprising a plurality of springs, at least one of the plurality of springs secured between the inner surface of the first blade component and a tooth from the first set of teeth and another one of the plurality of springs secured between the inner surface of the second blade component and a tooth from the second set of teeth.

4. The rotor blade assembly of claim 3, wherein the joint assembly further comprises one or more input devices exposed to on an outer surface of one of the first and second blade segments, each of the plurality of input devices engaged with at least one of the first and second sets of teeth or one of the plurality of springs such that a user can release the first and second blade segments from each other from the outer surface.

5. The rotor blade assembly of claim 1, wherein the first and second sets of teeth are constructed of a flexible material, a rigid material, a metallic material, one or more composite materials, or combinations thereof.

6. The rotor blade assembly of claim 1, wherein the first and second sets of teeth are adjustable.

7. The rotor blade assembly of claim 6, wherein the joint assembly further comprises an adjustable mounting device mounted at a first end of each of the first and second sets of teeth, the adjustable mounting device securing each of the first and second sets of teeth to the inner surface of the first and second blade segments.

8. The rotor blade assembly of claim 1, wherein at least one of the first or second blade segments corresponds to a blade tip segment of the rotor blade.

9. A method for joining multiple blade segments of a rotor blade, the method comprising:
aligning a first blade segment and a second blade segment in an end-to-end orientation at a chord-wise extending joint; and,
engaging first and second sets of teeth of the first and second blade segments, respectively, at the chord-wise extending joint, wherein engagement of the first and second sets of teeth secures the first and second blade segments in a locked position.

10. The method of claim 9, wherein engaging the first and second sets of teeth further comprises at least one of:
twisting one of the first and second blade segments with respect to the other,
pushing one of the blade segments into the other so as to engage the first and second sets of teeth of the joint assembly, or
utilizing a rail system connected to the first and second sets of teeth.

11. The method of claim 10, further comprising securing the first and second sets of teeth to an inner surface of the first and second blade segments, respectively.

12. The method of claim 11, wherein the joint assembly further comprises a spring-locking system, the spring-locking system comprising a plurality of springs, at least one of the plurality of springs secured between the inner surface of the first blade component and a tooth from the first set of teeth and another one of the plurality of springs secured between the inner surface of the second blade component and a tooth from the second set of teeth.

13. The method of claim 9, further comprising adjusting the first and second sets of teeth via an adjustable mounting device mounted at a first end of each of the first and second sets of teeth and securing each of the first and second sets of teeth to the inner surface of the first and second blade segments via the adjustable mounting device.

14. A method for disassembling multiple blade segments of a rotor blade, the rotor blade having a first blade segment and a second blade segment secured together in an end-to-end orientation at a chord-wise extending joint, the method comprising:
disengaging first and second sets of teeth of the first and second blade segments, respectively, of a joint assembly at the chord-wise extending joint; and,
removing one of the first and second blade segments from the other.

15. The method of claim 14, wherein disengaging the first and second sets of teeth of the first and second blade segments, respectively, of the joint assembly further comprises at least one of:
twisting one of the first and second blade segments with respect to the other,
pulling one of the blade segments apart from the other so as to disengage the first and second sets of teeth of the first and second blade segments, respectively, of the joint assembly, or
utilizing a rail system connected to the first and second sets of teeth of the first and second blade segments, respectively.

16. The method of claim 14, wherein the joint assembly further comprises a spring-locking system, the spring-locking system comprising a plurality of springs, at least one of the plurality of springs secured between an inner surface of the first blade component and a tooth from the first set of teeth and another one of the plurality of springs secured between an inner surface of the second blade component and a tooth from the second set of teeth.

17. The method of claim 14, further comprising releasing the first and second sets of teeth of the first and second blade segments, respectively, from an outer surface of the first and second blade segments via one or more input devices.

18. The method of claim 14, wherein at least one of the first or second blade segments corresponds to a blade tip segment of the rotor blade, and wherein the method further comprises replacing the blade tip segment with a different blade tip segment.

* * * * *